Aug. 22, 1939.  L. S. WEST ET AL  2,170,581
VEHICLE CONSTRUCTION
Filed Sept. 16, 1935   13 Sheets-Sheet 1
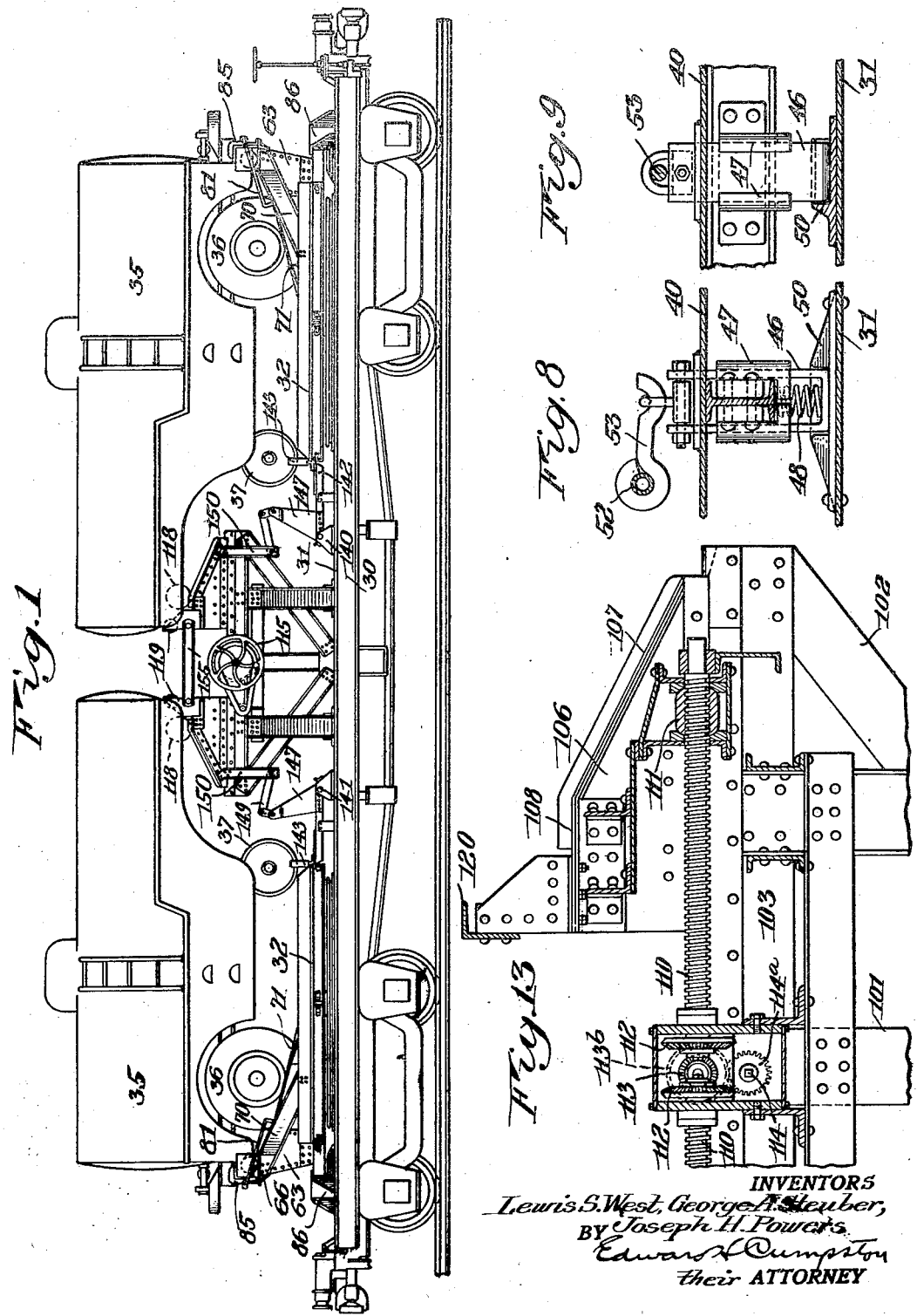
INVENTORS
Lewis S. West, George A. Steuber,
BY Joseph H. Powers
Edward H. Cumpston
their ATTORNEY

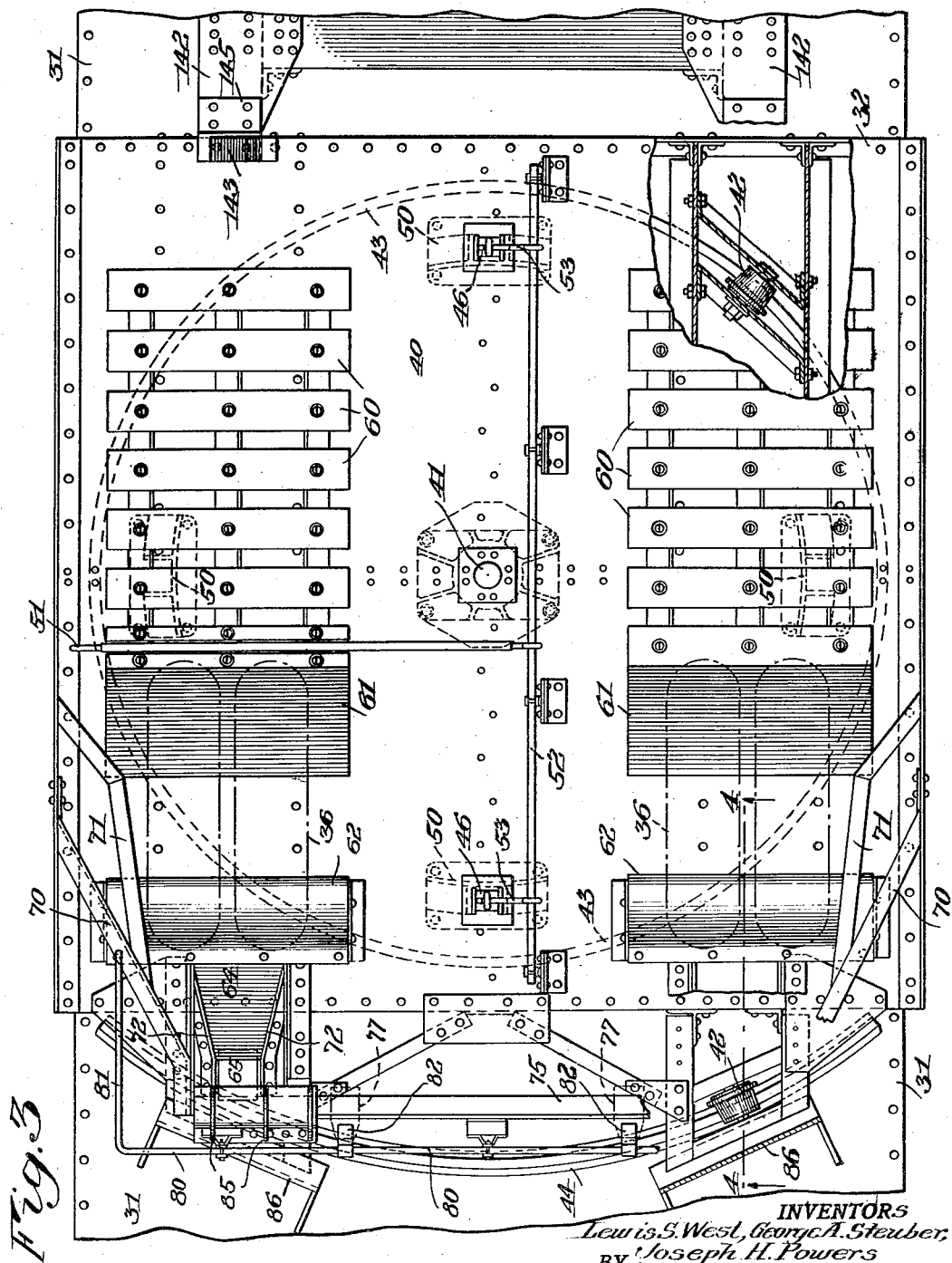

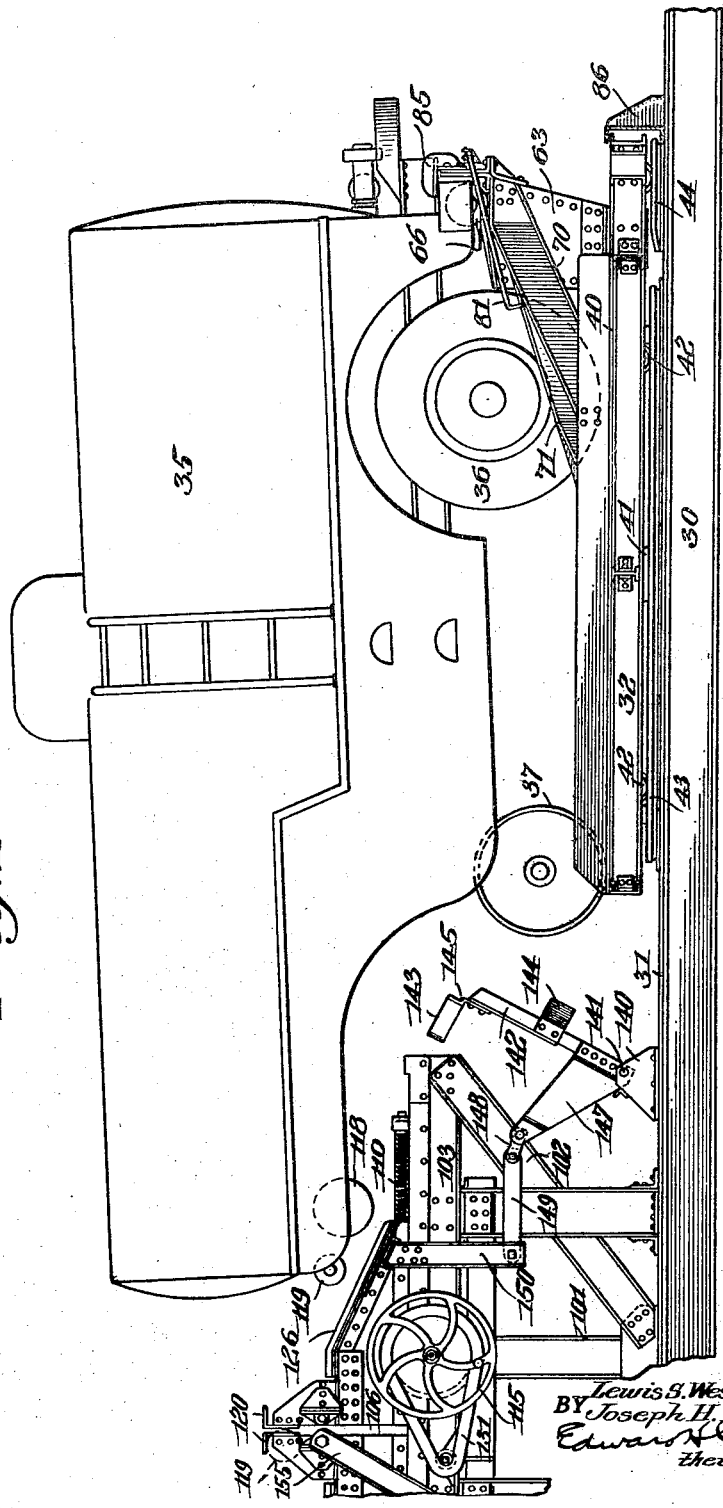

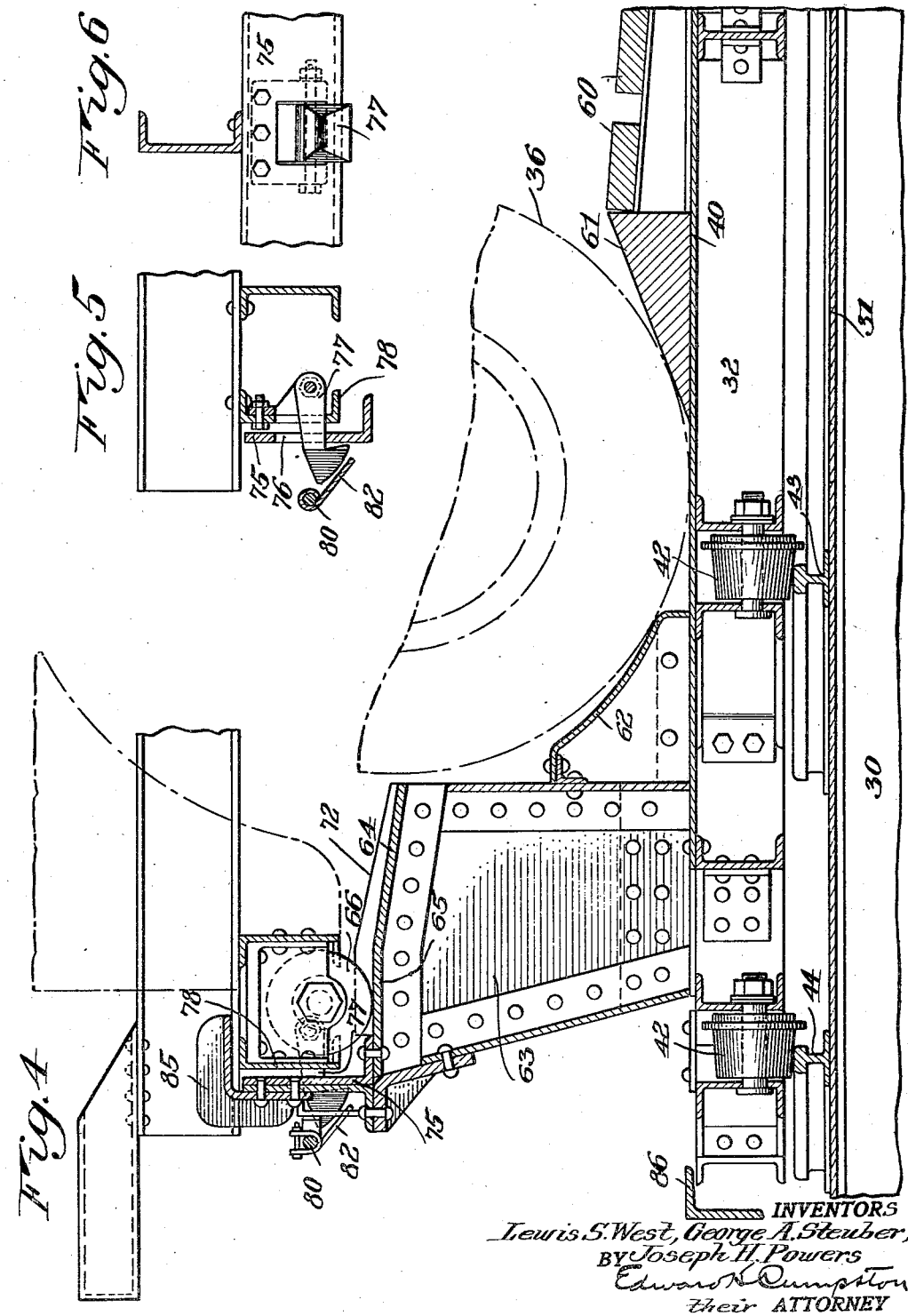

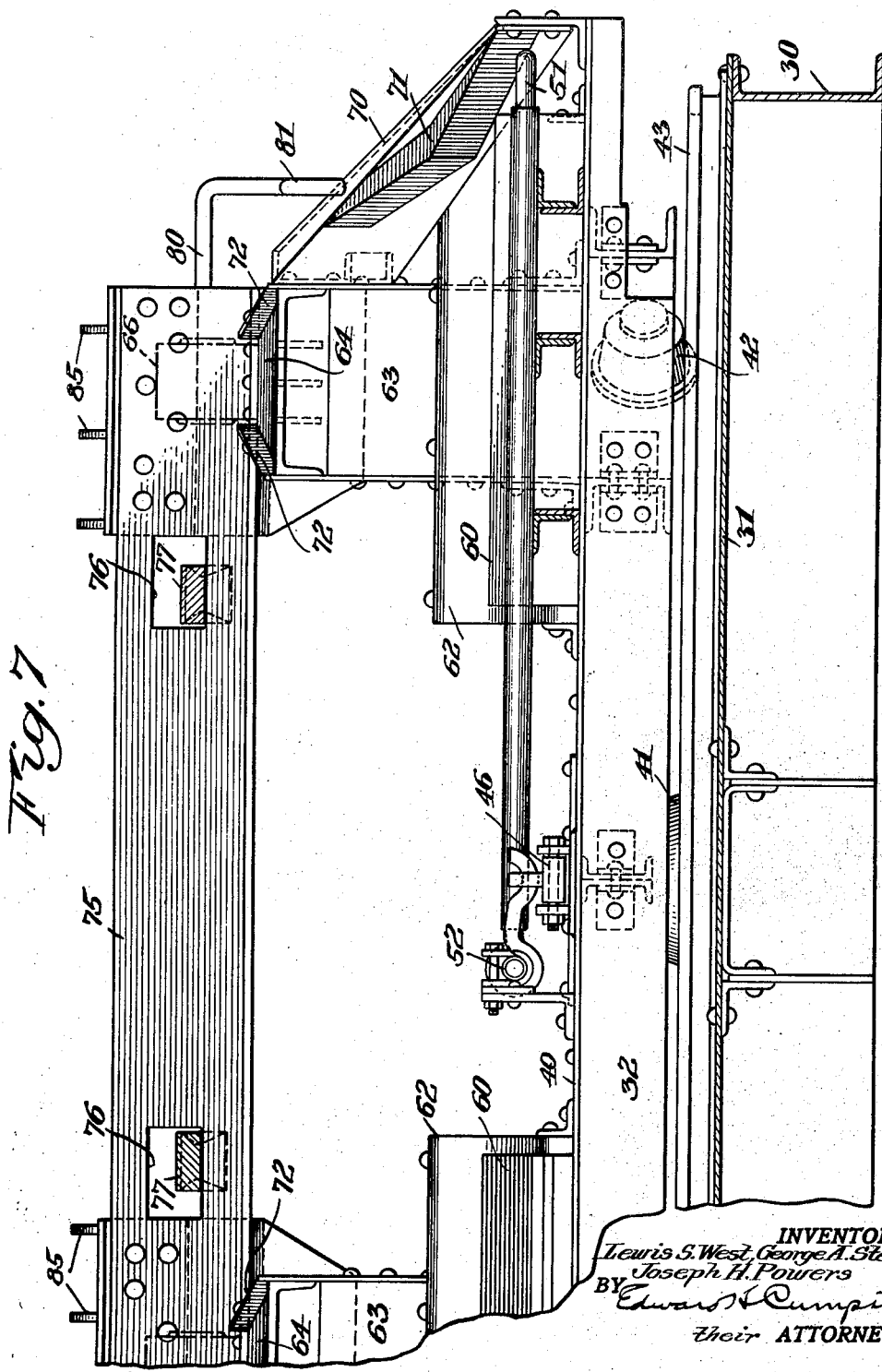

Aug. 22, 1939.   L. S. WEST ET AL   2,170,581
VEHICLE CONSTRUCTION
Filed Sept. 16, 1935   13 Sheets-Sheet 6
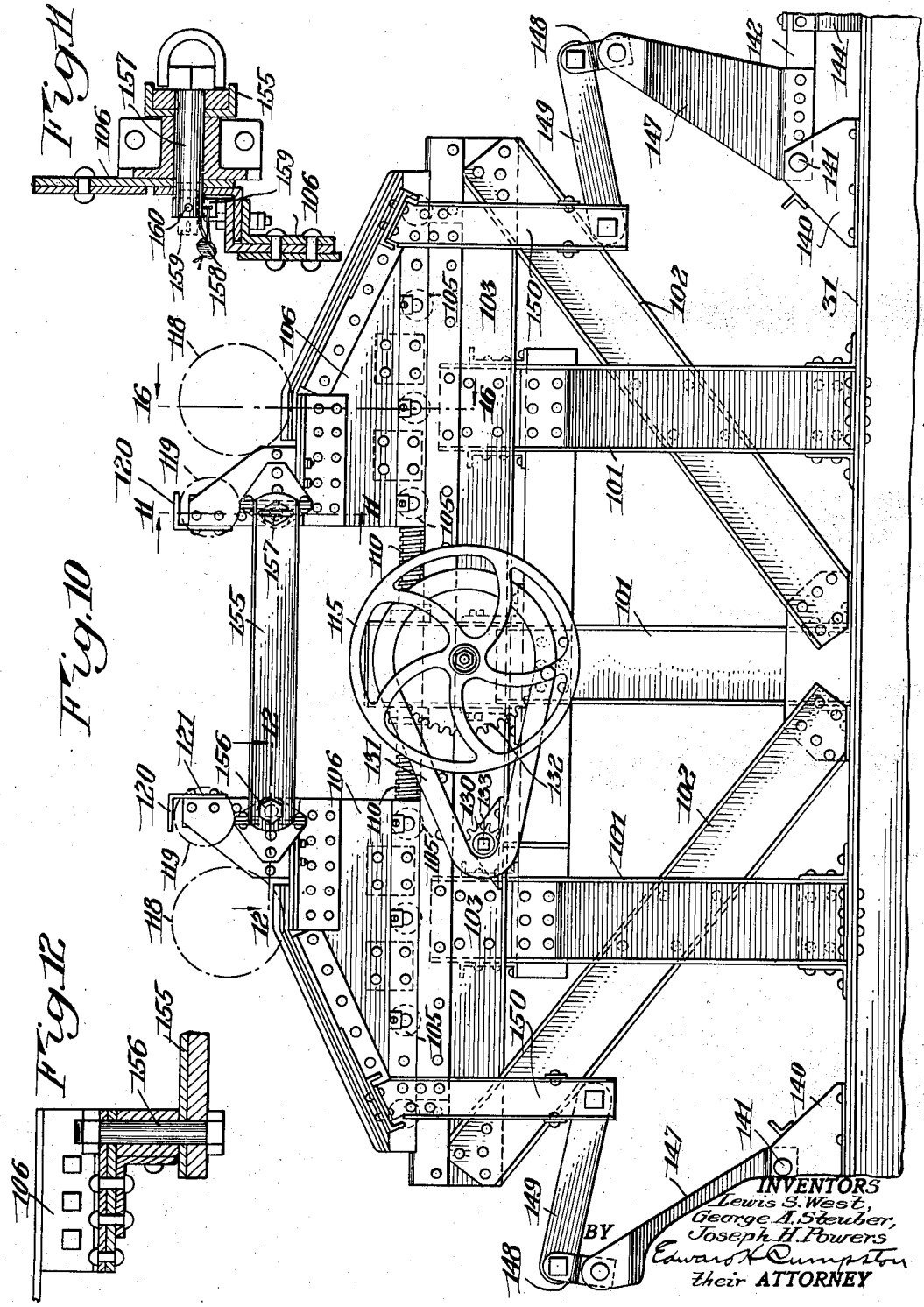
INVENTORS
Lewis S. West,
George A. Steuber,
Joseph H. Powers
BY Edward H. Cumpston
Their ATTORNEY

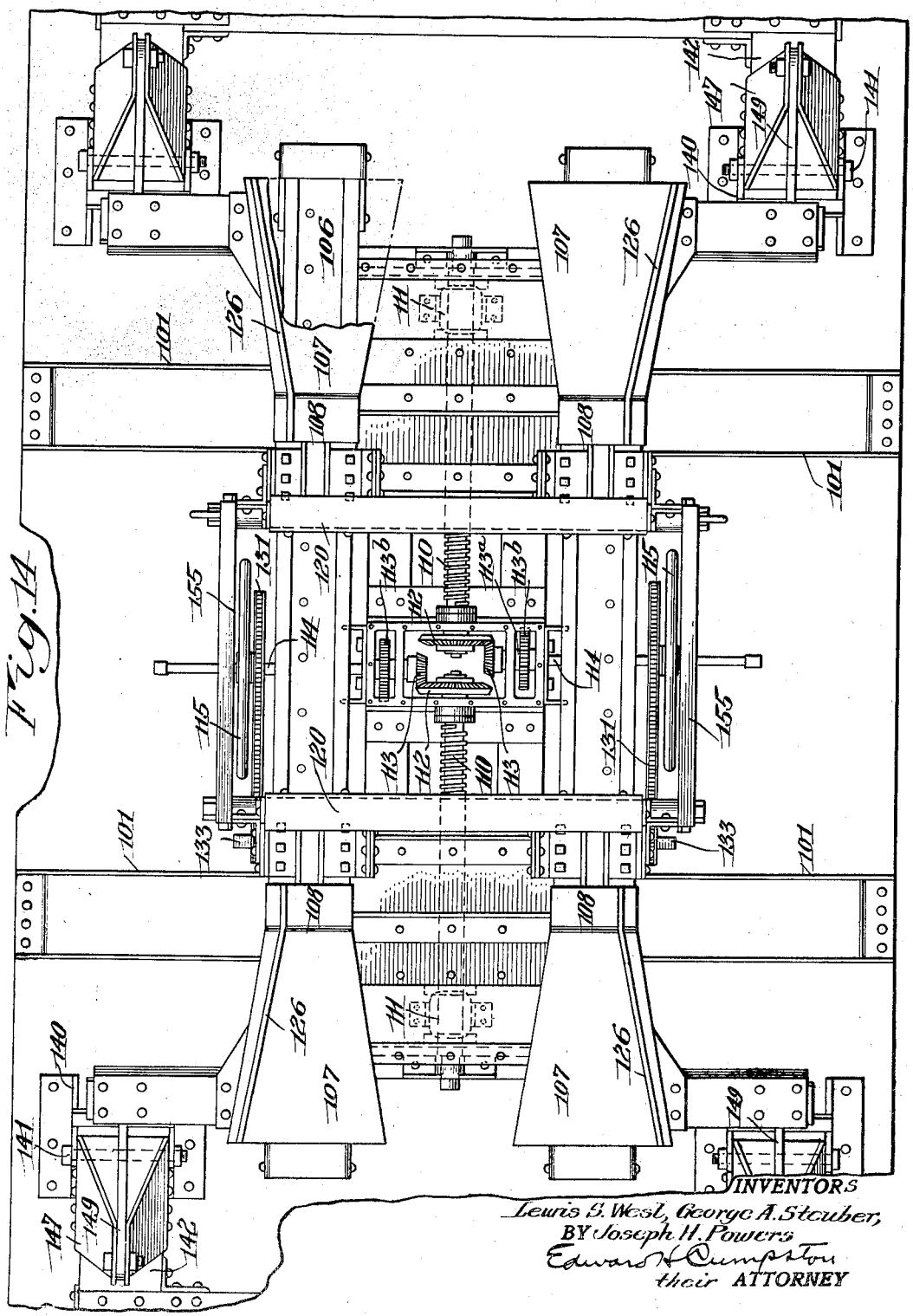

Aug. 22, 1939.   L. S. WEST ET AL   2,170,581
VEHICLE CONSTRUCTION
Filed Sept. 16, 1935   13 Sheets-Sheet 8
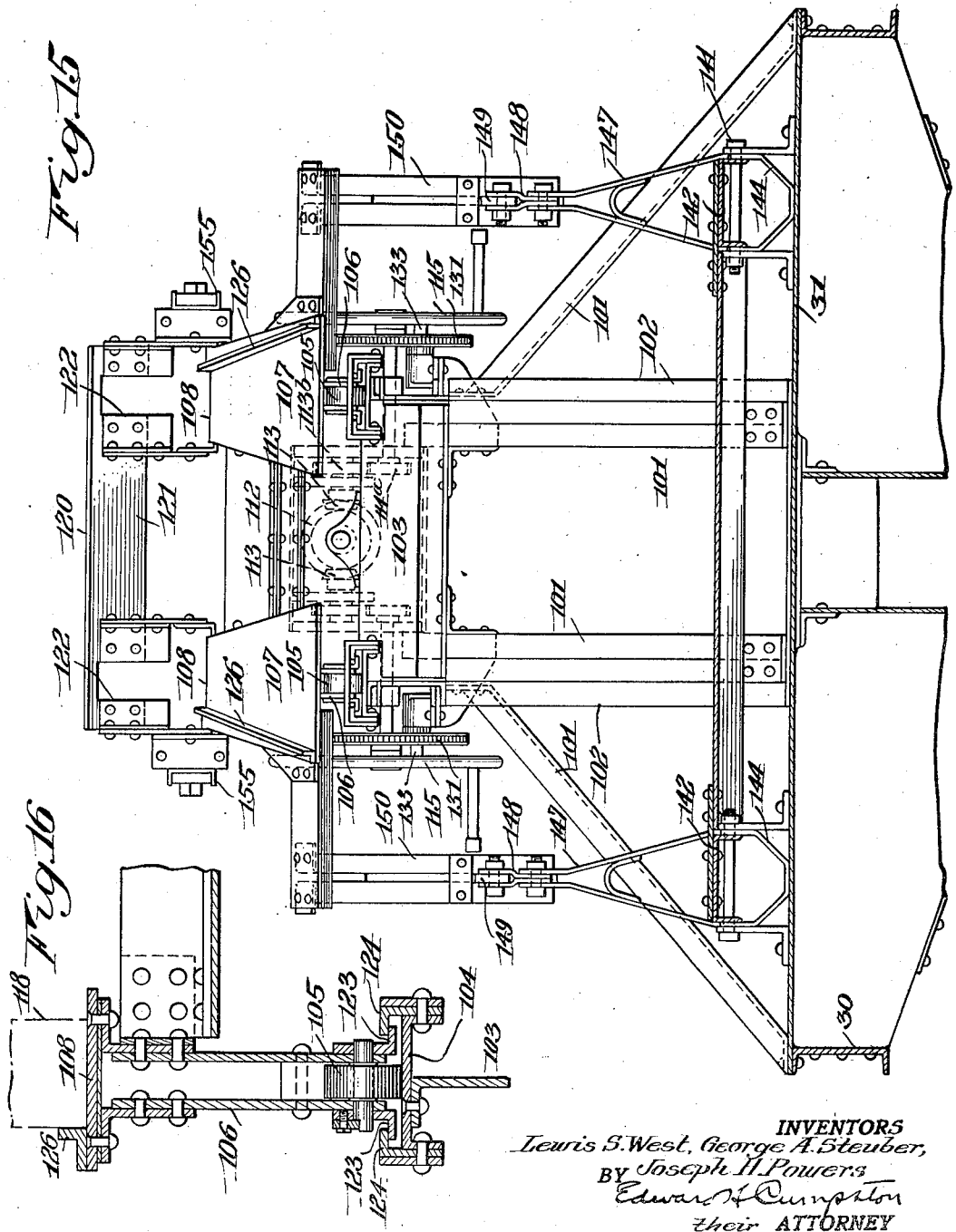

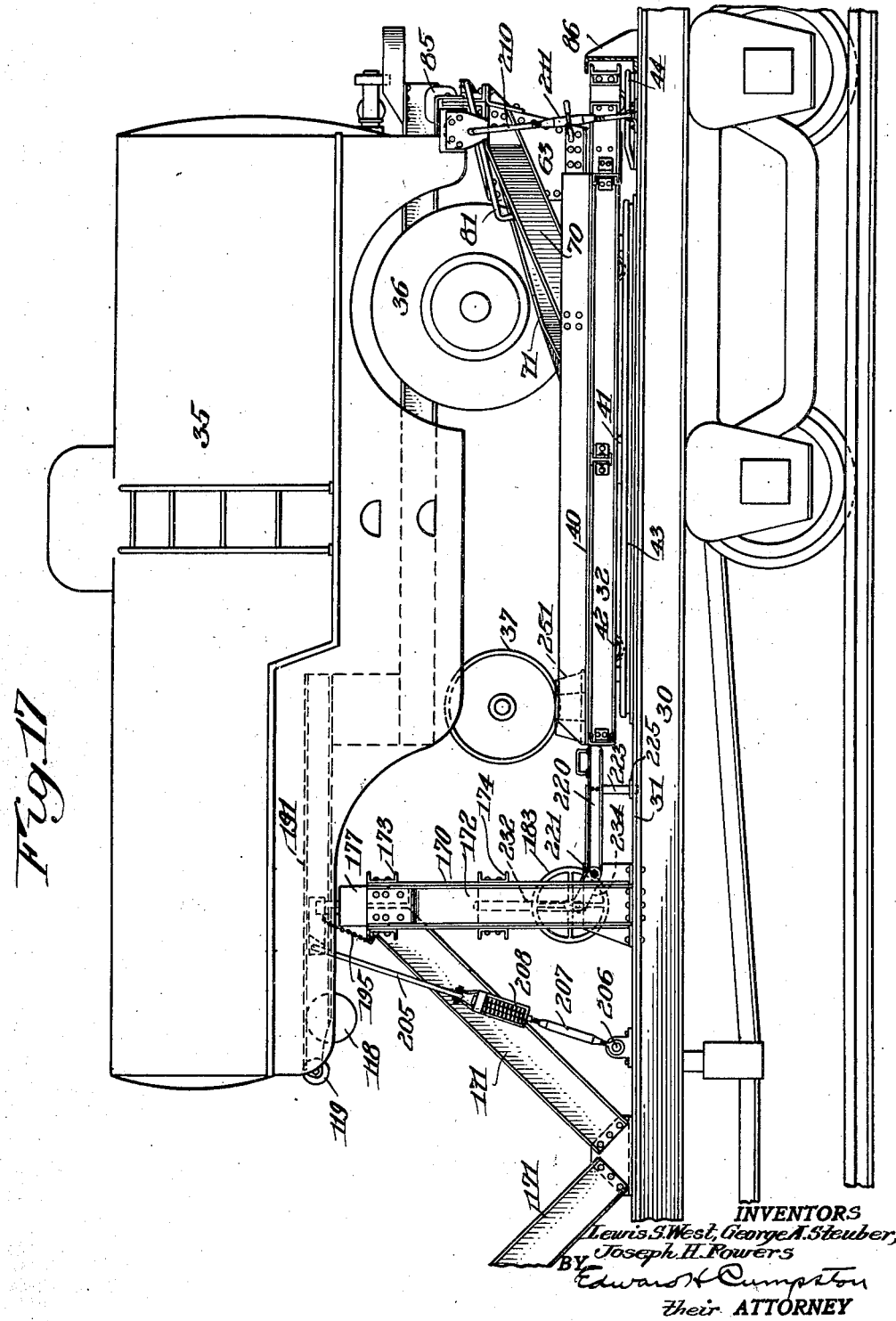

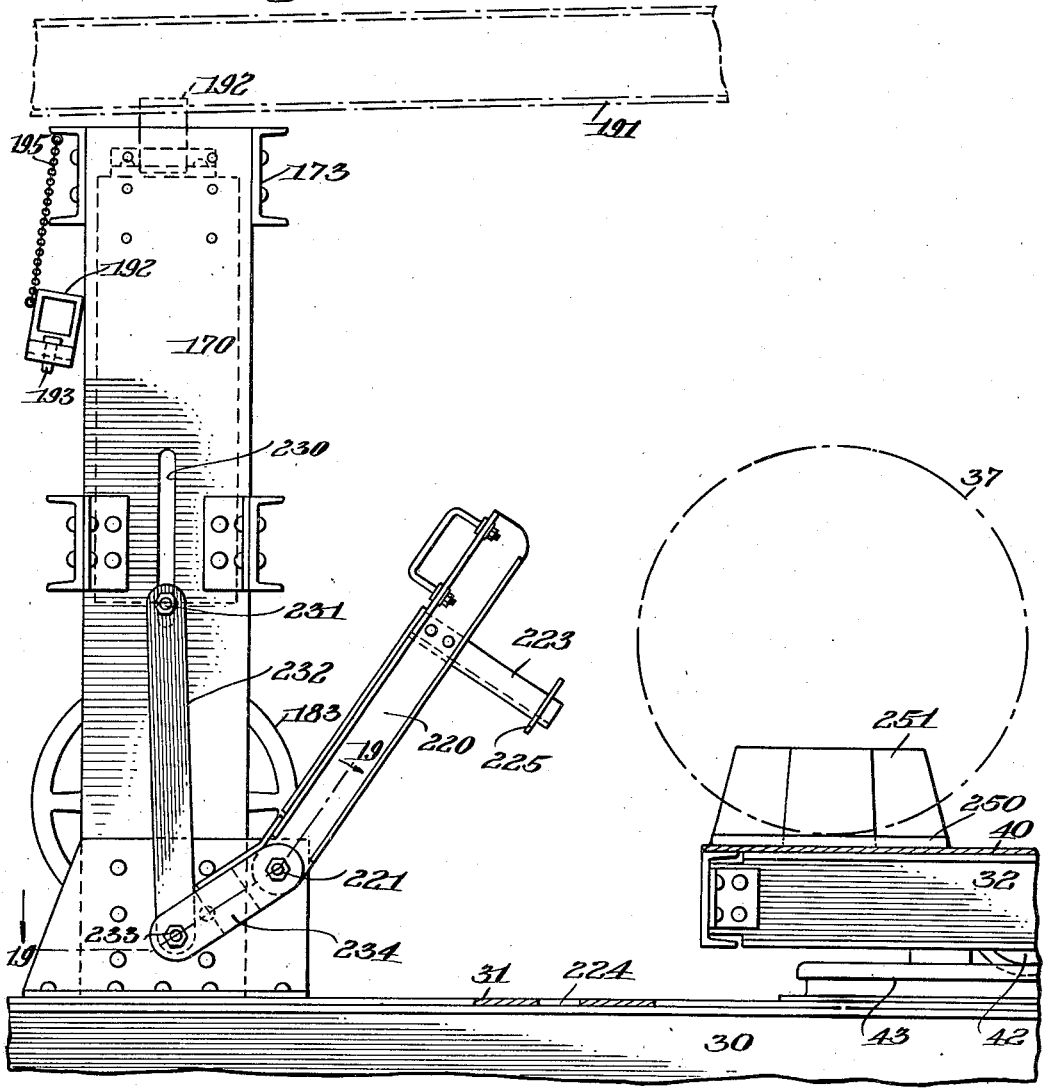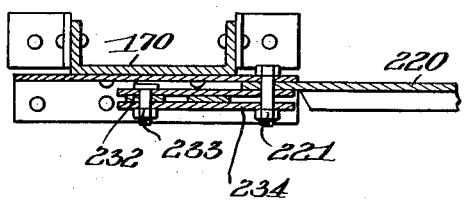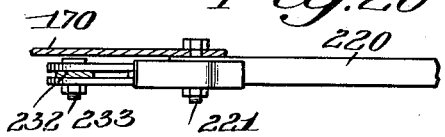

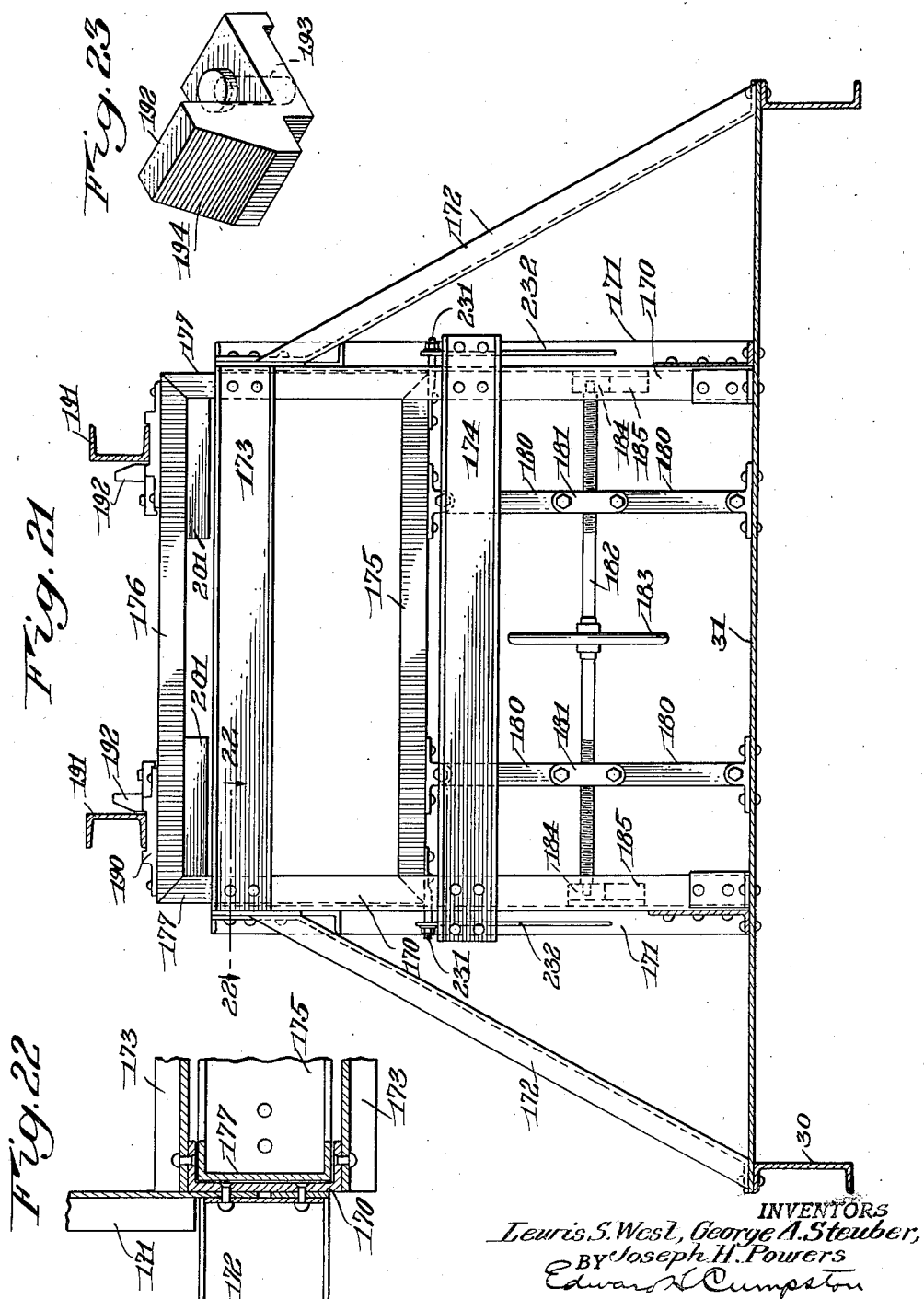

Aug. 22, 1939.  L. S. WEST ET AL  2,170,581
VEHICLE CONSTRUCTION
Filed Sept. 16, 1935  13 Sheets-Sheet 12
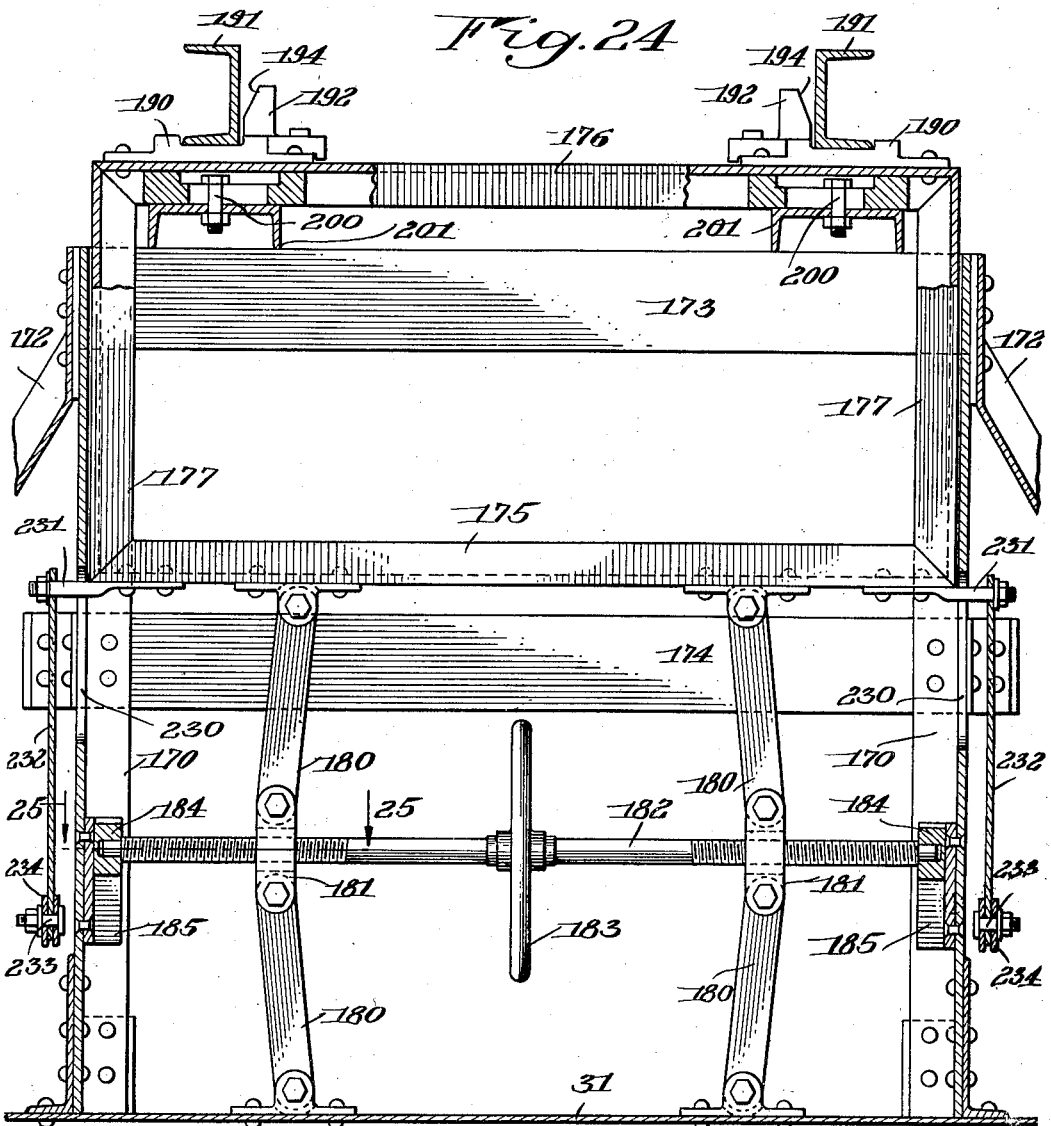
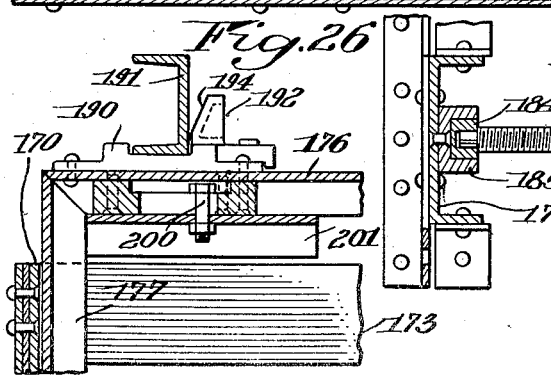
INVENTORS
Lewis S. West, George A. Steuber
BY Joseph H. Powers
Edward H. Cumpston
their ATTORNEY

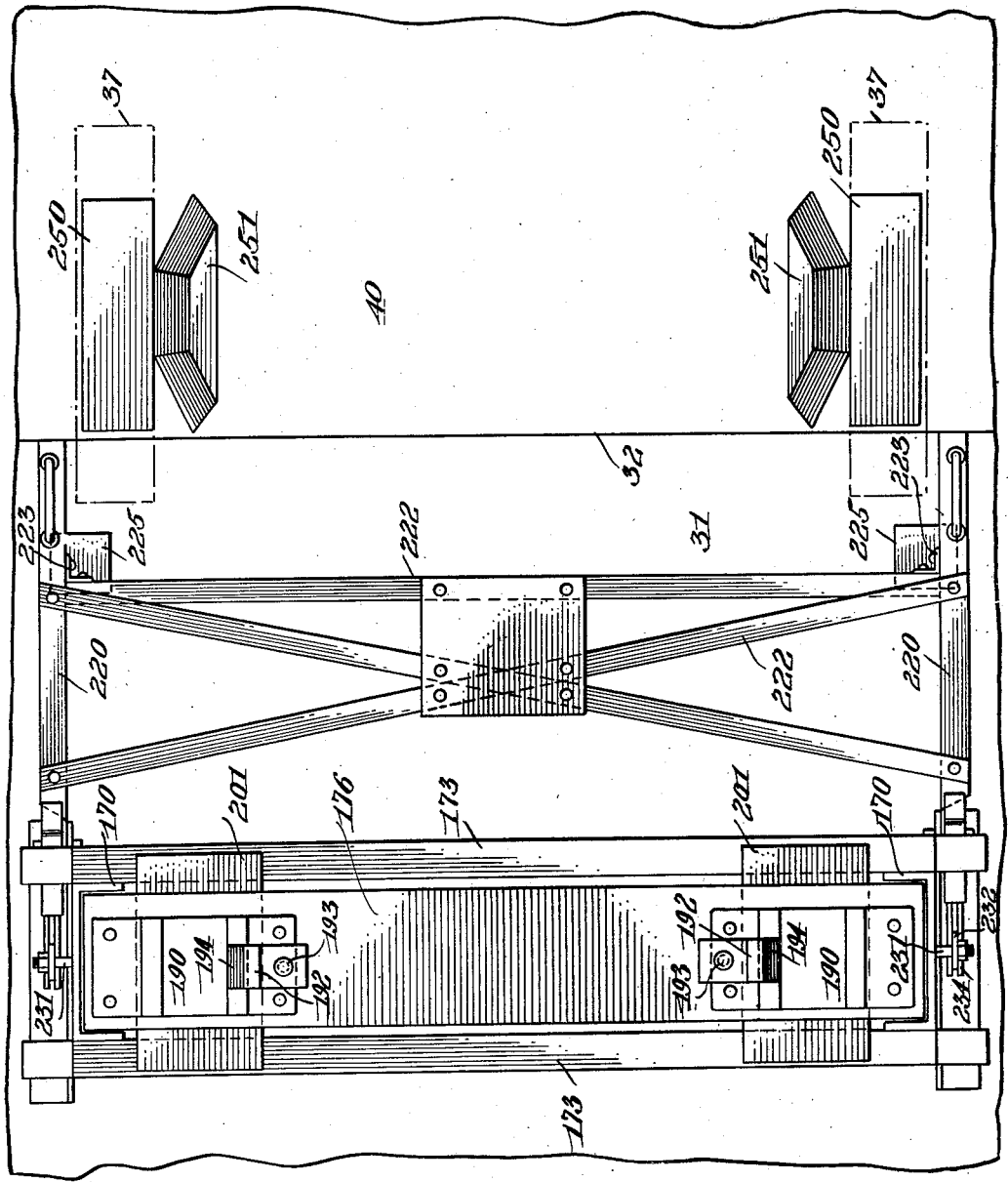

Patented Aug. 22, 1939

2,170,581

UNITED STATES PATENT OFFICE

2,170,581

VEHICLE CONSTRUCTION

Lewis S. West, Brighton, George A. Steuber, Penfield, and Joseph H. Powers, Rochester, N. Y.; Genesee Valley Trust Company, executors of Lewis S. West, deceased, assignors, by direct and mesne assignments, to Despatch Shops, Inc., East Rochester, N. Y., a corporation of New York Application September 16, 1935, Serial No. 40,662

49 Claims. (Cl. 105—159)

This invention relates to vehicles or cars, and more particularly to railway cars.

An object of the invention is the provision of a generally improved and more satisfactory vehicle, such as a railway car, so designed and constructed as to be particularly adapted to carry another vehicle, such as an automobile truck or trailer of an automobile truck.

Another object of the invention is the provision of such a vehicle so designed and constructed as to promote loading and unloading of the other vehicle or vehicles which it carries, with a minimum of time and effort.

Still another object is the provision of suitable locking mechanism on the carrying vehicle, or partly on the carrying vehicle and partly on the carried vehicle, to hold the carried vehicle securely in place on the carrying vehicle and to prevent dislodgment or shifting of one relatively to the other notwithstanding the jolts and jars to which the vehicles may be subjected.

A further object is the provision of simple and effective mechanism for lifting the weight of the carried vehicle, as, for example, to take the weight thereof wholly or partially off of certain wheels of the carried vehicle.

To these and other ends the invention resides in certain improvements and combinations of parts, all as will be hereinafter more fully described, the novel features being pointed out in the claims at the end of the specification.

In the drawings:

Fig. 1 is a side elevation of apparatus constructed in accordance with a preferred embodiment of the invention, with two carried vehicles locked on the carrying vehicle in normal position ready for travel;

Fig. 2 is a fragmentary view of certain parts shown in Fig. 1, illustrating the carried vehicle in a partially loaded or unloaded position;

Fig. 3 is a plan of a turntable for holding the carried vehicle, and associated parts;

Fig. 4 is a vertical section substantially on the line 4—4 of Fig. 3;

Fig. 5 is a vertical section illustrating part of the mechanism shown in Fig. 4 in greater detail;

Fig. 6 is a rear elevation of part of the mechanism shown in Fig. 5;

Fig. 7 is an elevation of part of the mechanism shown in Figs. 3 and 4;

Fig. 8 is an elevation with parts in vertical section of a turntable lock partially illustrated in Fig. 7;

Fig. 9 is a view of the mechanism shown in Fig. 8 seen from a different direction;

Fig. 10 is a side elevation of the principal parts of the mechanism for lifting and locking the carried vehicle;

Fig. 11 is a vertical section substantially on the line 11—11 of Fig. 10;

Fig. 12 is a horizontal section substantially on the line 12—12 of Fig. 10;

Fig. 13 is a vertical section taken substantially centrally through part of the mechanism shown in Fig. 10;

Fig. 14 is a plan of the mechanism shown in Fig. 10;

Fig. 15 is an end elevation of the mechanism shown in Fig. 10;

Fig. 16 is a vertical section substantially on the line 16—16 of Fig. 10;

Fig. 17 is a side elevation of apparatus constructed in accordance with a modified form of the invention illustrating a carried vehicle in normal loaded and locked position on the carrying vehicle;

Fig. 18 is a side elevation of part of the mechanism shown in Fig. 17 illustrating the parts in a different position ready for loading or unloading the carried vehicle;

Fig. 19 is a section substantially on the line 19—19 of Fig. 18;

Fig. 20 is a plan of part of the mechanism shown in Fig. 19. with parts in horizontal section;

Fig. 21 is an elevation of part of the mechanism shown in Figs. 17 and 18, with parts in vertical section;

Fig. 22 is a horizontal section substantially on the line 22—22 of Fig. 21;

Fig. 23 is a perspective view of a guiding lug;

Fig. 24 is a view similar to Fig. 21 on a somewhat larger scale with the parts in slightly different position;

Fig. 25 is a horizontal section taken substantially on the line 25—25 of Fig. 24;

Fig. 26 is a view similar to a fragment of Fig. 24 showing certain parts in a different position, and Fig. 27 is a plan of part of the mechanism shown in Figs. 17, 21, and 24.

The same reference numerals throughout the several views indicate the same parts.

Modern motor vehicle transportation offers, in some respects, various advantages over transportation by rail. Among these may be mentioned the ease of delivery of the product direct to its ultimate destination without the necessity of unloading the product from a railroad car and loading it upon a truck or dray for delivery from the railroad freight station to the ultimate destination. Yet motor vehicle transportation also has its disadvantages in comparison to railroad transportation, among which disadvantages may be mentioned the increasing congestion of the highways, the increased hazard of accident, and the slowness of motor truck movements in comparison to railroad train movements under many circumstances.

The present invention provides a practical solution of the problem of speedy and safe haulage over long distances and easy delivery to ultimate destination, by the provision of a railroad car especially designed and constructed for carrying all or part of a motor vehicle. Preferably the railroad car is designed to carry a motor truck trailer, although an entire motor truck can obviously be carried if so desired.

According to the present invention, in its preferred embodiment, the product to be transported is located at its place of origin on a motor truck trailer. The loaded trailer is then taken by its associated truck to the nearest railroad station, where the trailer is backed onto a turntable placed on a specially constructed railroad car. The turntable is then turned to bring the axis of the motor vehicle trailer into alinement with the axis of the railroad car, and the trailer is locked securely to the car by suitable mechanism. Each railroad car may hold one or more motor vehicle trailers or complete motor vehicles.

The railroad car with its load of one or more trailers is then taken by rail to the city of destination of the shipment. In this city, the trailer is unlocked from the railroad car and is turned on its turntable to an appropriate position for unloading from the railroad car. A motor vehicle unit similar to the one used at the place of origin of the shipment can then be attached to the trailer and can be used to pull the trailer from the railroad car and take it to its ultimate destination.

Thus, if the haul from point of origin to point of destination be of any great length, time is saved because of the speed of the railroad train in comparison to the permissible motor truck speed on public highways. Also, congestion of the public highways is lessened by keeping the motor truck off of the highway, and the hazards of the journey are reduced because of the greater safety of railroad transportation over motor vehicle transportation.

This transportation system has been found to be quite suitable for the transportation of fresh milk, for example. In large centers of population, such as New York city, for example, supplies of fresh milk must be drawn from many points quite far distant in order to provide the necessary quantity of milk. Speed of transportation is important, and it is also desirable to reduce the number of times the milk is handled insofar as possible, to avoid danger of contamination at each handling. Hence, if the milk be loaded at the dairy at which it is produced into a milk tank trailer for a motor vehicle, it will be seen that by the use of a railroad car of the present invention for transporting this trailer to the city of destination, the milk can be delivered direct to the bottling plant or other desired location in the city of destination, in a very short space of time, and without the necessity of removing the milk from the milk tank trailer until it reaches its destination. Milk originating several hundred miles from any large city can, by means of this invention, be delivered quickly and safely, in a pure and wholesome condition.

While milk has been mentioned as an example of a product to the transportation of which this invention is particularly suited, and while the loading of a motor vehicle or part of a motor vehicle on a railroad car has also been mentioned, the invention is not limited to these features. As the description proceeds, it will be apparent to those skilled in the art that many of the features of the construction described are useful in connection with an arrangement for transporting various loads, whether vehicles or otherwise, on a carrying vehicle, whether the carrying vehicle be in the form of a railroad car or otherwise. For example, many of the features of this invention are suitable or easily adaptable for the carrying of one vehicle, such as a small motor vehicle, on another vehicle, such as large motor truck. Also many of the features of the invention could be employed, for example, in carrying vehicles or other loads on watercraft, such as canal barges, ferry boats, and the like, and it is intended to include such watercraft within the meaning of the term "vehicle" as used broadly in this specification and in the accompanying claims.

Referring now to an embodiment of the invention which is at present preferred and which is designed particularly for carrying a milk tank trailer on a railroad car, there is shown in Fig. 1 of the drawings a railroad car having a frame 30 and a floor 31, which car is provided with two turntables, one near either end of the car and each designated in general by the numeral 32. Each turntable is adapted to receive a tank trailer for a motor vehicle, this tank trailer having a tank body 35, a pair of rear wheels 36 which normally carry the weight of the rear end of the trailer, and a pair of supporting wheels 37 which are normally raised off of the ground when the front end of the trailer is supported by and attached to its motor unit, and which are adapted to be lowered into contact with the ground to support the front end of the trailer when it is desired to detach the trailer from its motor unit. Except for a few details which will be mentioned below, this trailer, including the raising and lowering wheels 37, is of a standard and known construction, and need not be further described in detail. Obviously any desired number of turntables may be placed on each railroad car insofar as the size of the car permits, but two turntables are preferred in the present instance, so that two trailers may be carried on each railroad car. The two turntables may be identical with each other and a description of one will suffice for both.

Each turntable may have the construction best shown in Figs. 2 to 9 inclusive. It has suitable framing supporting a floor 40, and rotates about a central pivot 41. Suitable rollers or small wheels 42 on the turntable frame run on tracks 43 and 44 secured to the railroad car floor 31 to hold the turntable in parallel relation to the car floor. Two locking dogs or plungers 46 (Figs. 3, 7, 8, and 9) are slidable vertically in guideways 47 on the turntable frame and are resiliently pushed downwardly by springs 48, one within each plunger 46. The lower ends of these plungers engage in pockets formed by lugs or brackets 50 fixed to the car floor 31 and arranged in such position, as illustrated in Fig. 3, that the two plungers engage in two pockets when the turntable is turned with its main axis parallel to the main axis of the railroad car, and engage in two other pockets when the turntable is turned at right angles thereto. Thus the turntable may be locked in either of the two positions just mentioned. From either locked position it may be unlocked for rotation by lifting on a release lever 51 to cause a partial rotation of a shaft 52 to which this release lever 51 is connected, this shaft 52 having arms 53 interengaged with the upper ends of the plungers to lift them upwardly out of the locking pockets when the shaft 52 is turned.

On the turntable are two wheel runways formed by slats 60, which wheel runways are spaced the proper distance from each other to accommodate the wheels 36 of the vehicle intended to be loaded on the turntable, as may be seen in Fig. 3. These runways incline slightly upwardly from the front toward the back of the turntable and terminate in blocks 61 inclined more sharply downwardly as indicated in Fig. 4. As the vehicle is backed onto the turntable (when the turntable is turned laterally at right angles to the position shown in Fig. 3) the wheels roll over the runways provided by the slats 60 and then down the inclined blocks 61 and against chucks 62 so that the wheels ride in pockets or depressions between the members 61 and 62.

In alinement with each wheel runway near the rear edge of the turntable is a post or frame 63 having at its top a plate with an inclined portion 64 and a substantially horizontal portion 65. The vehicle to be loaded on the turntable is provided with two small rollers 66, one on either side, near the back end of the vehicle frame. As the vehicle is backed onto the turntable, the rollers 66 come into position over the plate 64, 65, and as the main vehicle wheels 36 roll rearwardly down the inclined blocks 61, the rollers 66 come down onto the plate 64 and take the weight or a considerable portion of the weight of the rear end of the vehicle. Continued rearward movement causes the rollers 66 to roll up the inclined portion of the plate 64 and onto the horizontal portion 65, to the position indicated in Figs. 2 and 4. In this position, most of the weight of the rear end of the vehicle is supported by the rollers 66 on the posts 63 and little weight is on the main vehicle wheels 36, which may, in fact, even be lifted slightly off of the turntable if desired.

Members 70 and 71 extending forwardly and outwardly from the posts 63 to the edges of the turntable provide bracing for the posts and at times may also form oblique guiding wings to guide the vehicle wheels 36 into proper central position laterally of the turntable. The members 71 lie so close to the sides of the vehicle wheels 36 when the vehicle is locked in normal position, that they prevent removal of the wheels or their tires and thus prevent theft of these parts during transportation. Oblique guiding flanges 72 may be provided on the plate 64 to serve as lateral guides for the rollers 66, for the purpose of centering the carried vehicle properly on the turntable.

It is convenient to latch the carried vehicle to the turntable in such manner as to prevent forward movement of the vehicle on the turntable when the front end of the vehicle is not locked by the locking mechanism hereafter described. This latching of the vehicle to the turntable may be conveniently accomplished by providing a cross beam 75 (Figs. 3 to 7, inclusive) secured to the upper rear corners of the posts 63. This beam 75 has openings 76 therein which register with latches 77 pivoted to a cross beam 78 constituting a part of the frame of the vehicle. As the vehicle is backed onto the turntable, the ends of the pivoted latches 77 enter the holes 76 in the beam 75, and the hooked ends of the latches engage over the lower edges of the holes 76 as indicated in Figs. 5, 6, and 7, thus securely latching the vehicle to the beam 75 and preventing forward movement of the vehicle on the turntable until the latches are released.

For releasing the latches when desired, there may be provided a cross shaft or rod 80 mounted in suitable brackets on the cross beam 75 and having at each end a forwardly bent handle 81 which is relatively long so as to obtain good leverage in turning the rod 80. This rod carries latch lifters 82 in alinement with and just beneath the rear ends of the latch members 77, so that when the handles 81 are lifted to turn the rod 80 in a counterclockwise direction when viewed as in Figs. 4 and 5, the latch lifters 82 will move upwardly to raise the latches 77 and release them from engagement with the beam 75, thus permitting forward movement of the vehicle on the turntable.

It is desirable also to provide strong means for holding down the rear end of the vehicle to prevent accidental raising thereof under the influence of such jolts or jars as are sometimes encountered in railway operation. The beam 75 is therefore provided with strong angle brackets 85 extending forwardly from the top edge of the beam 75 and overlying the cross member 78 of the vehicle frame as indicated in Fig. 4. It is apparent from Fig. 4 that the vehicle frame can rise only a very slight amount relatively to the turntable before it comes into contact with the brackets 85 which prevent further upward movement. The turntable itself is tied down to the car floor 31 by means of strong angle brackets 86 fixed to the car floor 31 and overlying portions of the turntable as shown in Figs. 2 and 4, without interfering with the rotation of the turntable about its central vertical axis. Thus if any jolt or jar tends to raise the rear end of the vehicle carried by the railroad car, the stress of such upward tendency is resisted by the brackets 85 and 86 which, in effect, tie the rear end of the vehicle down firmly to the railroad car.

When the vehicle has been run onto the turntable, usually with the turntable axis turned laterally so that the vehicle is run on from the side of the railroad car, and when the turntable is then turned to bring the major axis of the vehicle into alinement with the major axis of the railway car, the front end of the vehicle is then preferably locked in position and held firmly by suitable locking and holding mechanism. This mechanism may be of various forms, one preferred embodiment of the mechanism being now described with special reference to Figs. 10 to 16 inclusive of the accompanying drawings.

At a point adjacent the front end of the vehicle when in normal loaded position on the railroad car there are posts 101 and braces 102 firmly secured to the car floor 31 and carrying an elevated supporting frame 103 which is thus strongly braced. On this frame 103 are two substantially horizontal parallel trackways 104 extending lengthwise of the car on which rollers 105 may roll back and forth in a direction longitudinally of the car. These rollers 105 are mounted in two groups, one adapted to roll on each trackway, on a movable cam frame 106 providing inclined plates 107 terminating at their upper ends in flat plates 108. The cam frame 106 may be moved backwardly and forwardly along the trackways 104 by suitable means, such as a screw 110 journaled on the frame 103 and engaging a nut 111 on the cam frame 106. One end of the screw 110 may be provided with a bevel gear 112 which meshes with another bevel gear 113 on a transverse shaft 113a having a spur gear 113b meshing with a slightly smaller spur gear 114a on another transverse shaft 114 provided with an accessible hand wheel 115 by which the screw may be turned to move the cam frame 106.

The front end of the vehicle is provided with rollers 118 and 119 in alinement with each of the inclined cam plates 107 of the cam frame, each of these cam plates being substantially directly over one of the tracks 104, as indicated in Fig. 16, so that any weight resting on the plates 107 will be transmitted directly downwardly through the rollers 105 onto the track 104 of the elevated frame 103.

When the vehicle is being loaded on the railroad car, its front end is supported by the wheels 37 resting on the turntable near the front edge, as shown in Fig. 2, and the cam frame 106 is drawn forwardly out of the path of the rollers 118 and 119 before the vehicle and its turntable are swung around. When the turntable is swung to proper traveling position, and locked in that position, by means of the plungers 46 engaging in their pockets 50, the cam frame is then moved rearwardly, that is, toward the rear of the vehicle, from the initial loading position shown in Fig. 2 to the normal locked position shown in Figs. 1 and 10. This rearward movement of the cam frame brings the inclined cam plates 107 under the rollers 118 and 119 and lifts upwardly on these rollers, with the rollers rolling up the cam plate as the plate moves, thus elevating the front end of the vehicle, taking the weight entirely off of the wheels 37, and carrying the weight of the front end on the rollers 118 which, in the final locked position, rest upon the flat parts 108 of the cam plates, as indicated diagrammatically in Fig. 10, and as shown in Fig. 1.

When in this normal locked position, ready for traveling, the rollers 119 lie immediately beneath a flange 120 on a cross beam 121 secured to the cam frame 106, which flange 120 thus holds the forward end of the vehicle down and prevents any accidental upward movement thereof, just as the rear end is held down by means of the previously described pockets 85. Openings 122 (Fig. 15) may be cut in the cross beam 121 to permit the rollers 119 to extend partially through the plane of this beam 121, as indicated in Fig. 10, so that the rollers will lie squarely beneath the flange 120. Also, the side edges of the openings 122 embrace and are closely adjacent the sides of the rollers 119 and serve to prevent any lateral shifting of these rollers and thus to prevent any lateral shifting of the entire forward end of the vehicle, since the rollers 119 are securely mounted on the vehicle frame. Moreover, parts of the front end of the vehicle frame are substantially in contact with the cross beam 121 or the flange 120 which thus additionally prevents any forward movement of the vehicle.

The cam frame 106 itself is held firmly down on the tracks 104 and prevented from accidental upward movement by means of the lateral flanges 123 (Fig. 16) on the frame 106 which engage under inwardly extending flanges 124 secured to the elevated frame 103 which, in turn, is rigidly attached to and braced from the car floor 31.

The inclined cam plates 107 and their upper horizontal portions 108 may be provided with lateral guiding flanges 126 which flare outwardly, as indicated in Figs. 14 and 15, so as to guide the rollers 118 and 119 to a correct central position if they happen to be a little too far to one side or the other when the vehicle is being loaded.

The turning of the hand wheel 115 the required number of revolutions to move the cam frames from one position to the other is sometimes rather tedious, and as compressed air motors or other portable motors are frequently available in many locations where equipment of this kind would be used, means is provided for coupling the operating mechanism of the cam frame to any suitable portable motor. This means (as best shown in Figs. 10 and 14) comprises a sprocket 130 of relatively small diameter connected by means of a chain 131 to a larger sprocket 132 secured to the hand wheel shaft 114. The sprocket 130 is provided with an outwardly extending squared stub shaft end 133, which is of a suitable size to enter into and cooperate with a squared socket on the compressed air motor or other portable motor to be used. Hence, it is an easy matter to apply the socket of a portable motor to the squared stub end 133 and then by operation of the motor in one direction or the other, the shaft 114 may be turned to operate the screw 110 and to move the cam frame one way or the other as desired.

Where two turntables are provided on each railroad car, as in the preferred embodiment illustrated in Fig. 1, the cam mechanism above described may conveniently be placed substantially at the center of the car between the two turntables, the elevated frame 103 in such a case being made of sufficient size to accommodate two separate cam frames 106 for cooperation with the two vehicles carried by the two turntables. Since the two cam frames and associated parts may be duplicates of each other, the above description of one will suffice for both, the duplex construction being clearly shown in the drawings.

It is preferred also to provide additional locking means to cooperate with the carried vehicle to prevent any lateral shifting thereof during its transportation on the railroad car. Such additional locking means may be in the form illustrated particularly in Figs. 1, 2, 10, and 15. Upright flanges 140 are provided on the car floor 31 near each side thereof, and pivoted to these flanges by pivots 141 are arms 142 which, when in normal traveling position, extend rearwardly to a point approximately beneath the vehicle wheels 37, and which have lugs or brackets 143 extending upwardly along the sides of the wheels 37 as shown in Fig. 1. Stop members 144 secured to the arms 142 extend downwardly into contact with the floor 31 to determine the lowermost position of the arms 142. The arms are of such length that notches 145 at their ends engage over the forward edge of the turntable. Since the forward edge of the turntable is not arcuate but straight, as shown in Fig. 3, and since the arms 142 are offset laterally by a substantial distance from the center line of the car, it follows that the turntable cannot rotate when the notches 145 of the arms 142 are engaged with the forward edge of the turntable, because rotation of the turntable in either direction would necessarily cause the forward edge of the turntable to thrust longitudinally against one or the other of the arms 142, and these arms are both strong and well able to resist such longitudinal thrust, so that they serve as locking means, in addition to the locking plungers 46, for holding the turntable against rotation. Furthermore, the upwardly extending members 143 on these arms serve to prevent lateral displacement of the wheels 37 and thus tend to hold the vehicle against lateral shifting during its railroad journey.

The locking arms 142 may conveniently be operated to and from locking position in an automatic manner by the movements of the cam frame 106. To this end, each locking arm 142 has near its pivot 141 an upwardly extending operating arm 147 which is connected by links 148 and 149 to an arm 150 rigidly secured to and extending downwardly from the cam frame 106. The reason two links 148 and 149 pivoted to each other, are interposed between the arms 147 and 150, instead of using a single rigid link, is to provide a certain amount of lost motion, so that the arms 142 may be lowered fully to their home position before the cam frame 106 completes its movement and so that the cam frame may commence to move to an unlocking position before the locking arms 142 begin to move upwardly. When the cam frame 106 is fully withdrawn to the unlocking position shown in Fig. 2, the locking arms 142 are tilted up to the position also illustrated in Fig. 2, in which they are entirely out of the way and do not interfere with rotation of the turntable.

During the travel of the railroad car it is desirable to reduce to a minimum the stress of jolts and jars upon the screw 110, so that this screw will not be damaged. For this purpose, the two associated cam frames 106 may be locked to each other by means of a locking bar 155, or preferably two such locking bars, one at each side of each cam frame. Each locking bar 155 is pivoted to one cam frame 106 as by means of the pivot 156 (Figs. 10 and 12) and its other end is releasably connected to the other cam frame 106 as by means of a removable pin 157 (Figs. 10 and 11) which may be inserted through corresponding openings in the bar 155 and cam frame 106 when the two cam frames are both in their normal locked position. A suitable seal 158 of the kind commonly used in railroad practice, may be applied to one or both of the pins 157, the seal including a wire passed through a hole in a fixed part of the frame 106 and also through a hole in a member 159 connected to the pin 157 by a pivot 160 so that when the seal is removed, the member 159 may be swung around to the dotted line position shown in Fig. 11 to permit withdrawal of the pin 157. It is obvious that the carried vehicle can not be removed from the railway car without moving its associated cam frame 106 from the locking position shown in Fig. 10 to substantially the unlocked position shown in Fig. 2, and since such movement of the cam frame 106 can not take place without removal of the pin 157, it is apparent that the seal 158 must be destroyed in order to remove the carried vehicle from the railroad car.

When the pin 157 is removed it releases one end of the bar 155, which may then be swung out of the way around its pivot 156 as an axis, to lie, for example, in the position shown in Fig. 2, until both of the cam frames 106 have been moved to their normal locked positions, when the bar 155 may once more be placed in its locked position and the pin 157 may be placed through the alined holes in the bar and the cam frame.

In order to save space, the cam frames may be placed so close to each other that only one of them at a time can be withdrawn to its fully unlocked position. It is seen from Fig. 2 that the cam frame 106 cooperating with the vehicle shown in that figure has been moved to a considerable distance beyond the shaft of the hand wheel 115, and when in this position it prevents unlocking movement of the other cam frame cooperating with the other vehicle on the same railroad car. This is not detrimental, however, because ordinarily the vehicles are removed from the railroad car one at a time, and after the vehicle shown in Fig. 2 has been removed, the unlocked cam frame 106 can be moved idly back to its locked position to allow space for the movement of the other cam frame to its unlocked position.

A slightly modified form of construction of the means for elevating and holding the front end of the carried vehicle will now be described with special reference to Figs. 17 to 27, inclusive. In connection with this alternative elevating and locking construction, the turntable may be identical with the one heretofore described. In place of the elevated frame 103 and the cam frames 106 and associated mechanism, however, this alternative construction provides, for each vehicle to be carried, a frame comprising two upright posts 170 in a position slightly behind the front end of the vehicle to be carried, as shown in Fig. 17, which upright posts are rigidly braced by members 171 and 172 and which have a pair of cross beams 173 extending transversely of the car from one post 170 to the other post 170, approximately at the top ends of the posts. Other cross beams 174 may be provided about midway of the height of the posts 170.

The inner faces of the posts 170, that is, the faces toward each other, are of channel construction as shown in Fig. 22, to provide vertical guideways in which may slide a hollow rectangular frame comprising a bottom member 175, a top member 176, and end posts 177. This frame is operated upwardly and downwardly by means of toggle links 180 connecting the bottom member 175 of the movable frame to the car floor 31. The toggle links have, at their centers, nut members 181 engaging threads on a horizontal shaft 182 carrying a hand wheel 183, the ends of the shaft 182 being journaled in blocks 184 (Figs. 24 and 25) which may slide upwardly and downwardly in guideways 185. One of the screw threads on the shaft 182 is a right hand thread and the other is a left hand thread, so that when the shaft is rotated in one direction by the hand wheel 183, the two nut members 181 will travel toward each other, and when the shaft is rotated in the opposite direction, the two nut members 181 will move away from each other. By appropriately turning the shaft 182, the toggle members may thus be straightened to the position shown in Fig. 21, in which the frame 175, 176, 177 is at its uppermost position, or may be bent materially from the straight position so that the frame 175, 176, 177 may be lowered materially from the position shown.

On the upper rail 176 of the vertically movable frame are bearing blocks 190 spaced in proper position to receive frame members 191 constituting a part of the frame of the trailer or other vehicle to be carried on the railroad car. These bearing blocks 190 are notched to receive the lower edges of the vehicle frame members 191 so that when the frame members rest in these notches, lateral movement of the vehicle with respect to the blocks 190 is prevented. Also there are removable guiding and holding blocks 192 of the shape best shown in Fig. 23, which blocks have downwardly projecting pins 193 which may be inserted in holes in the blocks 190 to hold the blocks 192 in proper position in the blocks 190. These blocks 192 have inclined guiding faces 194. Each block 192 may conveniently be connected to a part of the adjacent framework by a flexible connection such as the chain 195, as shown in Fig. 18, so that when the blocks 192 are removed from the blocks 190, they will not become misplaced. The blocks 192, when in place on the blocks 190, serve as additional means for preventing lateral displacement of the vehicle relatively to the frame 176, in case the vehicle members 191 should rise high enough to escape from the notches in the bearing blocks 190.

With this arrangement, the vehicle is backed onto the turntable with the turntable turned to a transverse direction, all as previously described. Then, with the toggle links bent outwardly to lower the sliding frame 175, 176, 177 to its lowest position, and with the blocks 192 removed from the top of the blocks 190 to give additional clearance, the turntable is swung around to the normal traveling position shown in Fig. 17 so that the frame members 191 on the vehicle swing over the top of the frame member 176 and come to rest immediately over or approximately over the bearing blocks 190. Then the guiding blocks 192 are replaced on the blocks 190 with the pins 193 extending downwardly into their holes. After this, the hand wheel 183 is rotated to straighten the toggle links, thus causing the frame member 176 and the bearing blocks 190 to move upwardly, first to come into engagement with the bottom surfaces of the vehicle frame members 191, and then, upon further movement, to raise the front end of the vehicle until the weight of the front end thereof is taken entirely by the movable frame and the wheels 37 are raised off of the turntable. During this upward movement, if the frame members 191 are not perfectly alined with the bearing blocks 190, the inclined cam faces 194 on the blocks 192 will cause the vehicle frame to move slightly to one side or the other until it is perfectly alined with the blocks 190.

Loosely pivoted to the under side of the member 176 by means of pivots 200 are two short beams 201, of such width that they may pass upwardly and downwardly through the space between the beams 173 when they are turned parallel to these beams as in Figs. 21 and 26. During the raising of the frame by operation of the toggle, these beams 201 are in the position just mentioned. When the frame 175, 176, 177 has been elevated to its uppermost position, as shown in Fig. 21, the lower edges of the beams 201 are in a horizontal plane just above the upper edges of the stationary cross beams 173. The beams 201 are then turned 90° about their vertical pivots 200, to swing them to the position shown in Fig. 24, in which position they are crosswise of and overlie the beams 173. The toggle control shaft 182 may then be operated slightly in a reverse direction to swing the toggle links slightly outwardly to lower the frame 175, 176, 177 a short distance until the bottom edges of the beams 201 ride on the top edges of the beams 173, as shown in Fig. 24. In this way, the weight of the front end of the vehicle is transmitted directly from the bearing blocks 190 and frame member 176 through the beams 201 to the stationary beams 173, thus avoiding all stress in the toggle links 180 during the travel of the railroad car. When it is desired to unlock the vehicle from the railroad car, the hand wheel 183 is operated to straighten the toggle links, thus relieving the pressure from the beams 201, which are then turned 90° to a position in alinement with the space or opening between the beams 173, after which the toggle links can be bent to lower the frame 175, 176, 177 to its lowest position in order to release the front end of the carried vehicle and place its weight entirely on the turntable.

The front end of the carried vehicle may be held down against accidental upward movements during travel by any suitable means, such as the rods 205 (Fig. 17) having upper ends which hook into the vehicle frame, and lower ends pivoted to the railroad car body at 206, and having turn buckle means 207 for tightening the rod so that it will pull firmly down on the vehicle frame and hold it tightly against the bearing blocks 190. A spring 208 may be interposed in the rod 205 to provide some resilience to take care of shocks and jolts.

The rear end of the carried vehicle may also be additionally held down, if desired, by rods 210 hooking into suitable openings at the rear end of the vehicle frame and controlled by turn buckles 211. In many cases no such additional holding means is required for the rear end of the carried vehicle, however, because the brackets 85 and associated parts previously described are ordinarily found to be sufficient for holding down the rear end of the vehicle.

This alternative form of construction now being described may also include supplementary means for locking the turntable against rotation, somewhat similar to the locking means 142 previously described. For example, this supplementary locking means, as best shown in Figs. 17, 20 and 27, may comprise a pair of struts 220 pivoted to a fixed part of the railroad car at 221, the two struts being connected to each other by cross bracing 222. These struts have downwardly projecting stop members or legs 223 having ends which enter holes 224 in the car floor 31 and having abutments 225 to contact with the car floor 31 and to limit the maximum downward movement of the struts 220. When these struts are in their lowermost position, illustrated in Fig. 17, they are in contact or substantially in contact with the front edge of the turntable 32 and thus prevent any rotation of the turntable.

As was the case with the struts 162 in the form previously described, these struts 220 may be raised and lowered automatically by the operation of the mechanism for raising the front end of the carried vehicle. For example, the stationary posts 170 may be provided with vertical slots 230, and pins 231 secured to the movable frame member 175 may extend outwardly through these slots 230 as best seen in Figs. 18 and 24. Links 232 are pivoted at their upper ends on the pins 231 and at their lower ends on pivots 233 mounted in short arms 234 rigidly connected to the struts 220 and extending on the opposite side of the fulcrums or pivots 221 from the struts. As the frame 175, 176, 177 is lowered to release the carried vehicle, the links 232 are depressed so that they push downwardly on the arms 234 and raise the struts 220 to the position shown in Fig. 18, in which they do not interfere with the rotation of the turntable and vehicle. When the frame 175, 176, 177 is raised to elevate and hold the front end of the vehicle, the struts 20 are automatically lowered to the position shown in Fig. 17, where they lock the turntable.

The back 40 of the turntable 32 may have secured to it bearing plates 250 (Figs. 18 and 27)

on which the vehicle wheels 37 may ride when the front end of the vehicle is not raised, and adjacent these bearing plates 250 there may be upstanding guiding lugs or wings 251 to assist in alining the vehicle in proper position laterally when it is being run onto the turntable.

A detailed explanation of the operation of each part of the apparatus has been given as the description proceeded, so that it is believed to be unnecessary to repeat a detailed explanation of the operation at this point. A brief review of the operation in general terms may, however, be appropriate.

The railroad car is placed on a siding beside a platform or ramp of a height substantially equal to that of the top surface of the turntable. The turntable is turned 90° from the position shown in Figs. 1, 2, and 3, so that its axis extends crosswise of the railroad car. Then the vehicle trailer is backed onto the turntable from the ramp or platform beside the railroad track, and latched to the turntable by means of the latches 77. The raisable and lowerable wheels 37, which form a standard part of the equipment of a well known type of trailer vehicle, are then lowered onto the front edge of the turntable, and the motor unit which, until this moment, has been attached to the trailer vehicle and carrying the front end thereof, is disconnected and taken away. The trailer vehicle now rests entirely on the turntable. The turntable, with the vehicle on it, is then turned 90° to swing the axis of the turntable and of the vehicle into alinement with the axis of the railroad car. Such turning of the turntable may be done by hand, or, more conveniently a cable may be attached to one side or a corner of the turntable and to the motor truck unit which has been used to bring the trailer vehicle to the railroad car, so that the motor truck unit can pull the turntable around to the desired position where the locking plungers 46 snap into appropriate pockets 50 to hold the turntable in proper alinement.

When the turntable has thus been turned, the vehicle has its front end in alinement with the elevating and holding mechanism, in approximately the position shown in Fig. 2 if the elevating mechanism of the first described form is used, or with the front end over but not in contact with the elevating frame 175, 176, 177 if the second described form of elevating mechanism is used. In either case, the weight of the front end of the vehicle is still borne by the wheels 37 which rest on the turntable.

The elevating mechanism is now operated. In the first form of elevating mechanism described, power applied by hand to the hand wheel 115 or by portable motor to the shaft 133 will rotate the screw 110 and move the elevating cam frame 106 from the position shown in Fig. 2 to the position shown in Figs. 1, 10, and 13, so that the rollers 118 and 119 at the front end of the trailer vehicle will be forced up the inclined cam surfaces 107, supporting the weight of the front end of the vehicle and taking the weight off of the wheels 37. When both of the trailer vehicles to be carried on the same railroad car have thus been completely loaded, the beams 155 may be swung into position and the pins 157 shoved into place to hold the elevating cam carriages securely in position and remove stress from the threads of the screw 110.

If the second described form of elevating mechanism is employed, rotation of the hand wheel 183 will straighten the toggle links 180 to raise the elevating frame 175, 176, 177 which thus carries the weight of the front end of the vehicle and lifts the wheels 37 off of the turntable. By turning the beams 201 as above described and then slightly lowering the frame 175, 176, 177, the weight is taken off of the toggle links and any danger of damage to the screw threads on the shaft 182 is obviated. The holding down rods 205 are now attached to the vehicle and the turn buckles 207 are tightened to hold the front end of the vehicle firmly down on its support.

The railroad car, with its trailer vehicles securely loaded thereon is now ready for transportation to its destination. When it arrives at its destination, it is placed on a siding beside a suitable ramp or platform of a height approximately equal to that of the turntables. The front end of each vehicle is lowered by a reverse operation of the elevating mechanism, so that the weight of each vehicle is again carried entirely by its own turntable. Then the turntable may be turned 90° until the front end of the vehicle extends laterally outwardly beyond the side of the railroad car, the latches 77 being effective to latch the vehicle to the turntable during this rotation of the turntable so as to prevent any accidental running of the vehicle off of the turntable. A motor truck unit of suitable type adapted to cooperate with this style of trailer vehicle is then run under the overhanging end of the vehicle at the side of the railroad car, and connected to the vehicle in known manner, the wheels 37 then being elevated by known mechanism so that the front end of the trailer vehicle is supported by the motor truck unit rather than by the wheels 37. After this, the latches 77 may be released by raising the release levers 81, and the trailer vehicle is then free to be run off of the turntable by operation of the motor truck unit, and the trailer and its contents may thus be taken over streets or highways directly to the ultimate destination of the contents.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. A vehicle comprising a frame, turntable means mounted on said frame for rotation thereon, said turntable means being adapted to have a load placed thereon from a lateral direction with respect to said vehicle when said turntable means is turned to one position and to be turned with the load thereon to another position for carrying the load in transit, and means mounted on said frame for carrying part of the weight of said load independently of said turntable means when said load and said turntable means are in said position for transit.

2. A vehicle comprising a frame, turntable means mounted on said frame for rotation thereon, said turntable means being adapted, when turned to one position, to have a load placed thereon from a lateral direction with respect to said vehicle with the weight of the load supported entirely by said turntable means but with a portion of said load projecting beyond an edge of said turntable means, said turntable means being further adapted to be turned with said load thereon to another position for carrying the load in transit, and means mounted on said frame for contacting with said projecting portion of said load to support part of the weight of said load independently of said turntable means when said load and said turntable means are in said position for transit, while leaving another part of the weight of said load supported by said turntable means.

3. A vehicle comprising a frame, a turntable for receiving a load, means on said turntable for raising a part of said load, and means on said frame for raising another part of said load to lift a part of the weight thereof from said turntable.

4. A vehicle comprising a frame, a load receiving turntable rotatably mounted on said frame, means for latching said turntable in either one of a plurality of positions relatively to said frame, a latch member mounted on the load for oscillating movement about an axis at a substantial elevation above the bottom of the load, and a substantially rigid upward extension on said turntable to cooperate with said latch member for latching said load to said turntable.

5. A vehicle comprising a frame, a load receiving turntable rotatably mounted on said frame, a substantially rigid upward extension mounted on said turntable and rising to a material height above the bottom thereof, pivoted latch means for latching said load to said upward extension on said turntable, and other means independent of said turntable for holding said load in predetermined position relatively to said frame.

6. The combination with a vehicle frame, of a turntable element mounted on said frame for rotation thereon, a load element adapted to be placed upon said turntable element, pivoted latching means mounted on one of said elements for oscillation about a substantially horizontal pivotal axis to engage and disengage the other of said elements to latch said load element releasably to said turntable element to hold said load element against movement on said turntable element while said turntable element is being turned, and a shaft rotatably mounted on the other of said elements and having an arm effective when said shaft is turned in one direction to contact with said latching means and move said latching means to disengaged position.

7. A vehicle comprising a frame, two load carrying turntables each rotatably mounted on said frame and spaced from each other, and mechanism between said two turntables for holding at least a portion of the loads carried by both turntables.

8. A vehicle comprising a frame, two load carrying turntables rotatably mounted on said frame and spaced from each other, and mechanism between said two turntables for elevating a part of the load carried by each turntable to take a part of the weight of each load off of its associated turntable.

9. A vehicle comprising a frame, a load carrying turntable rotatably mounted on said frame, means on said frame for elevating a portion of a load carried by said turntable, and locking means operated automatically by operation of said elevating means for locking said turntable against rotation.

10. A vehicle comprising a frame, a load carrying turntable rotatably mounted on said frame, means on said frame for elevating a portion of a load carried by said turntable, a pair of struts movably mounted on said frame and adapted to be swung into a position blocking said turntable against rotation or into another position freeing said turntable for rotation, and means connecting said struts to said elevating means to swing said struts by operation of said elevating means.

11. A vehicle comprising a frame, a load carrying turntable rotatably mounted on said frame, said turntable having adjacent one end a substantial upward extension acting as an abutment preventing movement of a load off of said end of said turntable, and a pair of oblique members extending downwardly from said upward extension to a lower part of said turntable at opposite sides thereof and acting as braces to strengthen said upward extension and also as guiding means for centering one end of a load relative to the turntable as the load is moved onto the turntable.

12. A vehicle comprising a frame, a load carrying turntable rotatably mounted on said frame, means on said turntable for overlying a part of the load to prevent substantial upward movement of the load relatively to the turntable, and means on the frame for overlying a part of the turntable to prevent substantial upward movement of the turntable.

13. A vehicle comprising a frame, a load carrying turntable rotatably mounted on said frame, means on said turntable for overlying a part of the load to prevent substantial upward movement of the load relatively to the turntable, and means on the frame for overlying a part of the turntable to prevent substantial upward movement of the turntable, said means on said frame overlying a part of said turntable at a point on approximately the same side of the turntable as the part of the turntable which overlies a part of said load, when said turntable is in normal load-transporting position with respect to said frame.

14. A vehicle for carrying a wheeled load having a wheel for normal contact with a road when the load is in motion and a roller normally out of contact with the road, said vehicle comprising a frame, a turntable rotatably mounted on said frame for carrying said wheeled load, and means forming an inclined surface on said turntable for cooperation with said roller on said load, so that as said load is moved on said turntable, said roller may ride up said inclined surface to lift part of the weight of the load off of said wheel.

15. A vehicle comprising a frame, a load carrying turntable rotatably mounted on said frame, a post on said turntable having an inclined upper surface for lifting a part of the load as the load moves on said turntable, and means adjacent to said post for overlying a part of the load to prevent substantial upward movement thereof.

16. A vehicle comprising a frame, a load carrying turntable rotatably mounted on said frame, two posts rising from said turntable adjacent one edge thereof, each of said posts having near its upper end an inclined surface upon which a part of the load may move, a beam connected to both of said posts, and means for latching the load to said beam.

17. A vehicle comprising a frame, a turntable on which a load may be placed when the turntable is in one position and which may then be swung with its load to place the load in a different position, and inclined cam means mounted on said frame and movable in a substantially horizontal direction under a part of said load when said load is in said different position, to lift a part of the weight of said load off of said turntable.

18. A vehicle comprising a frame, a turntable on which a load may be placed when the turntable is in one position and which may then be swung with its load to place the load in a different position, inclined cam means mounted on said frame and movable in a substantially horizontal direction under a part of said load when said load is in said different position, to lift a part of the weight of said load off of said turntable, and screw means for operating said inclined cam means.

19. A vehicle comprising a frame, a turntable on which a load may be placed when the turntable is in one position and which may then be swung with its load to place the load in a different position, a substantially vertically movable frame having a portion under a part of said load when said load is in said different position, and toggle means for moving said vertically movable frame upwardly to lift a part of the weight of said load from said turntable.

20. A vehicle comprising a frame, a turntable on which a load may be placed when the turntable is in one position and which may then be swung with its load to place the load in a different position, a substantially vertically movable frame having a portion under a part of said load when said load is in said different position, toggle means for moving said vertically movable frame upwardly to lift a part of the weight of said load from said turntable, and screw means for operating said toggle means.

21. A vehicle comprising a frame, two load carrying turntables rotatably mounted on said frame and spaced from each other, cam means between said two turntables for lifting a part of the load carried by one turntable, other cam means also between said two turntables for lifting a part of the load carried by the other turntable, means for operating both of said cam means, and means other than said operating means for locking said two cam means to each other.

22. A railroad car comprising a frame, a load carrying turntable rotatably mounted on said frame, means on said turntable for holding one end of a load carried by the turntable in predetermined position with respect to the turntable, and means on said frame for holding the other end of said load carried by the turntable in predetermined position with respect to the frame independently of the turntable.

23. A railroad car comprising a car frame, two load carrying turntables mounted on said frame adjacent opposite ends thereof, and mechanism mounted on said frame between said turntables for engaging the loads carried by both turntables to hold said loads in predetermined position with respect to said car frame.

24. A railroad car comprising a car frame, a turntable mounted on said frame for receiving a load having an overhanging part projecting beyond an edge of said turntable at an elevation substantially above said turntable, and supporting means mounted on and projecting upwardly from said car frame to one side of said turntable for contacting with said overhanging part of said load to tend to hold said load in fixed position relatively to said car frame.

25. A railroad car comprising a car frame, a turntable mounted on said frame for receiving a load having an overhanging part projecting beyond an edge of said turntable at an elevation substantially above said turntable, and supporting means mounted on and projecting upwardly from said car frame to one side of said turntable for contacting with said overhanging part of said load to support part of the weight of said load independently of said turntable.

26. A railroad car comprising a car frame, two turntables mounted on said frame adjacent opposite ends thereof, each of said turntables being adapted to receive a load having a part over the turntable and an overhanging part projecting beyond the turntable on the side thereof toward the other turntable, and supporting means mounted on said car frame between said two turntables for contacting with the overhanging parts of the loads on both turntables to tend to hold both of said loads in fixed position relatively to said car frame.

27. A railroad car comprising a car frame, two turntables mounted on said frame adjacent opposite ends thereof, each of said turntables being adapted to receive a load having a part over the turntable and an overhanging part projecting beyond the turntable on the side thereof toward the other turntable, and supporting means mounted on said car frame between said two turntables for contacting with the overhanging parts of the loads on both turntables to support part of the weight of both loads independently of their respective turntables.

28. A railroad car comprising a car frame, a turntable rotatably mounted on said car frame and adapted to receive a wheeled load of the type including ground engaging wheels and also a roller substantially above the ground level, and means on said turntable forming an inclined surface up which said roller may roll as said wheeled load is run onto said turntable, to lift said load and to relieve at least a part of the weight thereof from said ground engaging wheels thereof.

29. A railroad car comprising a car frame, a turntable rotatably mounted on said car frame for receiving a load having wheels for engaging the ground, said turntable supporting the entire weight of said load while said turntable is being turned to shift the position of said load relatively to said car frame, means mounted on said turntable adjacent one end of said load for contacting with said load otherwise than through the ground-engaging wheels thereof, to relieve certain of said wheels of at least a part of the weight of the load, and means mounted on said car frame adjacent the opposite end of said load for contacting with said load to support a part of the weight of said load otherwise than through the ground-engaging wheels thereof and otherwise than through said turntable.

30. In apparatus for securing a vehicle on a railway car, means on said car for supporting one end of said vehicle independently of the wheels on the latter including a turntable, a ramp on said turntable for lifting said vehicle in response to movement of the latter onto said turntable and means including releasable locking means for holding the vehicle on said ramp, and means for securing the other end of said vehicle on the car comprising a supporting member and means on said member for holding said vehicle against movement on said member.

31. A railroad car comprising a car frame, a turntable rotatably mounted on said car frame and adapted to receive a wheeled load of the type including ground engaging wheels and also supporting means substantially above the ground level, and means on said turntable forming an inclined surface engageable by said supporting means as said wheeled load is run onto said turntable to lift said load and to relieve at least a part of the weight thereof from said ground engaging wheels thereof.

32. In apparatus for securing a vehicle on a railway car, the combination of means on said car for supporting the rear portion of said vehicle comprising a turntable and inclined tracks thereon adapted to cooperate with said vehicle to lift the same, means for supporting the front portion of said vehicle including a supporting member, and means including complementary recesses and lugs on said member and vehicle for holding said vehicle against movement on said supporting member.

33. In apparatus for securing a vehicles on a railway car, means on said car for supporting one end of said vehicle including a turntable and an inclined ramp on said turntable for lifting the vehicle, and means holding said vehicle against substantial movement relative to said turntable including releasable locking means for preventing said movement in one direction.

34. In apparatus of the class described, a turntable, a vehicle having wheels normally supporting the same, and cooperating members on said turntable and vehicle for wholly or partially relieving said wheels of said support upon movement of said vehicle onto said turntable.

35. In appartus for securing a vehicle on a railway car, means on said car for supporting one end of said vehicle independently of the wheels on the latter including a turntable and means on said turntable responsive to the movement of said vehicle for lifting the latter, supporting means on said car for the other end of said vehicle, and means coacting with said supporting means for holding said other end of the vehicle against movement relative to said last named supporting means.

36. A vehicle transporting device comprising in combination a railway flat car, a member rotatably mounted on said car, raised supporting means on said member, a vehicle having wheels thereon for supporting the same, and means on the vehicle adapted to cooperate with said supporting means to transfer the support of said vehicle from said wheels to said raised supporting means upon movement of the vehicle toward said raised supporting means.

37. In apparatus for transporting a road vehicle on a railway car, rotatable means for supporting one end of said vehicle independently of the wheels on the latter, supporting means for the other end of said vehicle, and means coacting with said last mentioned supporting means for holding the vehicle against movement relative thereto.

38. In apparatus of the class described, means for supporting one end of a vehicle, a turntable, and means for securing the other end of said vehicle on said turntable to hold the vehicle safely thereon while the turntable is being turned, so that by turning said turntable with the vehicle thereon, said first-named end of the vehicle may be arcuately moved into and out of cooperative relation to said supporting means.

39. In apparatus of the class described, means for supporting one end of a vehicle, a turntable, means for securing the other end of said vehicle on said turntable to hold the vehicle safely thereon while the turntable is being turned, so that by turning said turntable with the vehicle thereon, said first-named end of the vehicle may be swung into and out of cooperative relation to said supporting means, and coacting means on said vehicle and supporting means for limiting the movement of the former relative to the latter.

40. Apparatus for supporting a wheel supported vehicle on a railway car comprising means for supporting one end of said vehicle including a turntable, and coacting means on said turntable and vehicle to lift the latter in response to relative movement between the vehicle and turntable for at least partially relieving said wheels of the support of said vehicle.

41. In apparatus for supporting and securing a wheel supported vehicle on a railway car, the combination of means for supporting one end of said vehicle comprising a turntable, coacting means on said turntable and vehicle to lift the latter in response to relative movement between the vehicle and turntable for at least partially relieving the vehicle wheels of the support of said vehicle, and means including releasable locking means for limiting the movement of said vehicle in any direction relative to the turntable.

42. In apparatus of the class described, means for supporting one end of a vehicle including a turntable, means adapted to coact with said vehicle for lifting the latter off its normal means of support in response to movement of the vehicle onto the turntable and means for limiting the movement of the vehicle relative to the turntable, supporting means for the other end of the vehicle, and means for limiting the movement of said vehicle relative to said last-named means.

43. Apparatus of the class described comprising in combination a railway car, rotatable means mounted on said car, a vehicle having wheels thereon for normally supporting at least one end thereof, and means responsive to movement of said vehicle onto said first-named means for relieving said wheels of at least part of the support of the vehicle.

44. A method of loading a trailer on a railway car which consists in backing the rear end of the trailer onto said car from the side of the latter by means of detachable power means, lifting said rear end upon a rotatable support by means of the motive power of said power means, and swinging the front end of the trailer about the pivot of said rotatable support and into cooperative relation to a support therefor on the car.

45. In apparatus for transporting a road vehicle on a railway car, means for supporting one end of said vehicle pivotally mounted on said car, said supporting means comprising means responsive to movement of the vehicle onto the supporting means for lifting said end of the vehicle from its normal means of support.

46. In apparatus for transporting a road vehicle on a railway car, supporting means for one end of said vehicle mounted on said car for pivotal movement relative thereto, said supporting means and vehicle being adapted to cooperate during movement of the vehicle onto said supporting means to lift said vehicle from its normal means of support, and means for locking said supporting means in a predetermined position.

47. A railroad car comprising a car frame, a turntable mounted on said frame for receiving a load having an overhanging part projecting beyond and edge of said turntable at an elevation substantially above said turntable, and means mounted on and projecting upwardly from said car frame to one side of said turntable for contacting with and supporting said overhanging part of said load.

48. A railroad car comprising a car frame, means mounted on said car frame for rotation about a vertical axis and adapted to receive a wheeled vehicle of the type including ground engaging wheels normally supporting one end thereof, means for securing said wheel supported end of the vehicle to said rotatably mounted means, and means on said car for supporting the other end of said vehicle.

49. In apparatus of the class described, a turntable, a vehicle having wheels normally supporting the same, cooperating means on said turntable and vehicle for wholly or partially relieving said wheels of said support upon movement of said vehicle onto said turntable, and means on said turntable for guiding said vehicle relative to said turntable as the vehicle is moved onto the turntable.

LEWIS S. WEST.
GEORGE A. STEUBER.
JOSEPH H. POWERS.